(12) United States Patent
Yu

(10) Patent No.: US 8,963,833 B2
(45) Date of Patent: Feb. 24, 2015

(54) METHOD AND APPARATUS FOR CONTROLLING FLEXIBLE DISPLAY IN PORTABLE TERMINAL

(71) Applicant: Samsung Electronics Co., Ltd, Gyeonggi-do (KR)

(72) Inventor: Bo-Hyun Yu, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 127 days.

(21) Appl. No.: 13/681,369

(22) Filed: Nov. 19, 2012

(65) Prior Publication Data

US 2013/0162556 A1 Jun. 27, 2013

(30) Foreign Application Priority Data

Dec. 23, 2011 (KR) .................. 10-2011-0141574

(51) Int. Cl.
| | | |
|---|---|---|
| *G09G 5/00* | (2006.01) | |
| *G06F 3/033* | (2013.01) | |
| *G06F 3/041* | (2006.01) | |
| *G06F 1/16* | (2006.01) | |
| *G06F 3/0487* | (2013.01) | |
| *G06F 3/0486* | (2013.01) | |
| *G06F 3/0481* | (2013.01) | |
| *H04M 1/02* | (2006.01) | |

(52) U.S. Cl.
CPC .............. *G06F 3/041* (2013.01); *G06F 1/1652* (2013.01); *G09G 2380/02* (2013.01); *G06F 2203/04102* (2013.01); *G06F 3/0487* (2013.01); *G06F 1/1694* (2013.01); *G06F 3/0486* (2013.01); *H04M 1/0268* (2013.01); *G06F 3/04817* (2013.01)

USPC ......... 345/156; 345/157; 345/158; 178/18.01; 178/20.01

(58) Field of Classification Search
CPC ... G06F 3/0484; G06F 3/0485; G06F 3/0486; G06F 2203/04102; G09G 2380/02
USPC ...................... 345/156–158; 178/18.01–20.04
See application file for complete search history.

(56) References Cited

U.S. PATENT DOCUMENTS

| | | | |
|---|---|---|---|
| 6,954,679 B1 * | 10/2005 | Takeda et al. ................. | 700/165 |
| 7,456,823 B2 | 11/2008 | Poupyrev et al. | |
| 8,543,166 B2 * | 9/2013 | Choi et al. ..................... | 455/566 |
| 2004/0008191 A1 | 1/2004 | Poupyrev et al. | |
| 2007/0205997 A1 * | 9/2007 | Lieshout et al. .............. | 345/204 |

(Continued)

FOREIGN PATENT DOCUMENTS

| | | |
|---|---|---|
| EP | 2192750 A2 | 6/2010 |
| JP | 2004-046792 | 2/2004 |

(Continued)

OTHER PUBLICATIONS

Notice of Preliminary Rejection dated May 30, 2013 in relation to Korean Application No. 10-2011-0141574, 8 pages.

(Continued)

*Primary Examiner* — Ilana Spar

(57) ABSTRACT

A portable terminal includes an apparatus for controlling a flexible display in a touch screen of the portable terminal. The portable terminal includes a controller that detects a curvature of a screen, determines a point in the screen, at which a curvature degree is greatest, as a center, and moves an object on the screen toward the center.

20 Claims, 4 Drawing Sheets

(56) References Cited

U.S. PATENT DOCUMENTS

| | | | |
|---|---|---|---|
| 2007/0242033 A1* | 10/2007 | Cradick et al. | 345/156 |
| 2007/0247422 A1* | 10/2007 | Vertegaal et al. | 345/156 |
| 2009/0085866 A1 | 4/2009 | Sugahara | |
| 2009/0219247 A1 | 9/2009 | Watanabe et al. | |
| 2010/0011291 A1* | 1/2010 | Nurmi | 715/702 |
| 2010/0117975 A1 | 5/2010 | Cho | |
| 2010/0124879 A1* | 5/2010 | Cohen et al. | 455/3.06 |
| 2011/0227822 A1* | 9/2011 | Shai | 345/156 |
| 2013/0093753 A1* | 4/2013 | Rissa et al. | 345/419 |
| 2013/0120239 A1 | 5/2013 | Suzuki et al. | |
| 2014/0292717 A1* | 10/2014 | Kang et al. | 345/174 |

FOREIGN PATENT DOCUMENTS

| | | |
|---|---|---|
| JP | 2007-534055 | 11/2007 |
| JP | 2009-086403 | 4/2009 |
| JP | 2009-205565 | 9/2009 |
| JP | 2013-105310 | 5/2013 |
| KR | 10-2006-0134130 | 12/2006 |
| KR | 10-2010-0050318 | 5/2010 |
| KR | 10-2010-0052227 | 5/2010 |
| WO | WO 2011/005318 A2 | 1/2011 |

OTHER PUBLICATIONS

European Search Report dated Apr. 26, 2013 in connection with European Application No. 12191579.7, 7 pages.
International Search Report dated Feb. 7, 2013 in connection with International Patent Application No. PCT/KR2012/008490, 3 pages.
Written Opinion of the International Searching Authority dated Feb. 7, 2013 in connection with International Patent Application No. PCT/KR2012/008490, 3 pages.
Notice of Preliminary Rejection dated Nov. 19, 2013 in connection with Japanese Patent Application No. 2012-198454.
Notice of Final Rejection dated Nov. 27, 2013 in connection with Korean Patent Application No. 10-2011-0141574.
Notice of Patent Grant dated Apr. 30, 2014 in connection with Japanese Patent Application No. 2012-198454, 5 pages.
Notice of Final Rejection dated Sep. 30, 2014 in connection with Korean Application No. 10-2014-0019321; 12 pages.
Notice of Final Rejection After Reexamination dated Nov. 27, 2014 in connection with Korean Patent Application No. 10-2014-0019321; 6 pages.
Notice of Final Rejection After Reexamination dated Nov. 27, 2014 in connection with Korean Patent Application No. 10-2014-0019321; 15 pages.

* cited by examiner

METHOD AND APPARATUS FOR CONTROLLING FLEXIBLE DISPLAY IN PORTABLE TERMINAL

CROSS-REFERENCE TO RELATED APPLICATION(S) AND CLAIM OF PRIORITY

The present application is related to and claims priority under 35 U.S.C. §119 to an application filed in the Korean Intellectual Property Office on Dec. 23, 2011 and assigned Serial No. 10-2011-0141574, the contents of which are incorporated herein by reference.

TECHNICAL FIELD OF THE INVENTION

The present invention relates to a method and apparatus for controlling a flexible display in a portable terminal.

BACKGROUND OF THE INVENTION

Due to the development of electronic communication industries, portable terminals are becoming necessities in modern society and are becoming an important means for information transmission that is rapidly changing.

Recently, due to the development of UI (User Interface) and GUI (Graphical User Interface) systems and popularization thereof, portable terminals use flexible displays in addition to touchscreens. Since the flexible displays can be curved, they contribute to leading the fields restricted to conventional displays. For example, the flexible displays are applied to the field of e-books capable of replacing publications such as magazines, the field of ultra-mobile PCs (Personal Computers) capable of being carried by folding or rolling a display, and the field of new portable IT (Information Technology) products such as smart cards capable of providing information in real time.

The flexible displays can be curved, and this is sufficient to attract users.

However, since competitive quality displays are mass-produced, the flexible displays may disappear if further improvements are not made to the flexible displays. What is therefore sought is a user interface that utilizes the flexibility of a flexible display in an improved display of an object on a screen of the flexible display.

SUMMARY OF THE INVENTION

To address the above-discussed deficiencies of the prior art, it is a primary object to provide a method and apparatus for controlling a flexible display in a portable terminal, which changes the content of a screen when the flexible display is curved.

Another objet of the present invention is to provide a method and apparatus for controlling a flexible display in a portable terminal, which determines a point in a screen, at which a curvature degree is greatest, as a center when the flexible display is curved, and moves an object toward the determined center.

Another object of the present invention is to provide a method and apparatus for controlling a flexible display in a portable terminal, which measures a curvature degree at a point in a screen, at which an object is located when the flexible display is curved, determines a speed toward a next position according to a predetermined velocity corresponding to the measured curvature degree, and moves the object at the determined speed.

According to an aspect of the present invention, a method for controlling a flexible display in a portable terminal includes: detecting a curvature of a screen; determining a point in the screen, at which a curvature degree is greatest, as a center; and moving an object on the screen toward the center.

According to another aspect of the present invention, an apparatus for controlling a flexible display in a portable terminal includes: a flexible display unit; a curvature detecting unit for detecting a curvature of the flexible display unit and notifying the curvature to a control unit; a curvature degree measuring unit for measuring a curvature degree of the flexible display unit on the basis of coordinates and providing a measurement result to the control unit; a storage unit for storing data about an operation of the portable terminal; and the control unit for performing an algorithm for detecting a curvature of the flexible display unit from the curvature detecting unit, determining a point in a screen, at which a curvature degree is greatest, as a center from the measurement result received from the curvature degree measuring unit, and moving an object on the screen toward the center, with reference to the data stored in the storage unit.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 3B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged portable communication device. Exemplary embodiments of the present invention will be described herein below with reference to the accompanying drawings. In the following description, detailed descriptions of well-known functions or configurations will be omitted since they would unnecessarily obscure the subject matters of the present invention. Also, the terms used herein are defined according to the functions of the present invention. Thus, the terms may vary depending on users' or operators' intentions or practices. Therefore, the terms used herein should be understood based on the descriptions made herein.

The present disclosure relates generally to a method and apparatus for controlling a flexible display in a portable terminal, and in particular, to a method and apparatus for controlling a flexible display in a portable terminal, which changes the content of a screen when the flexible display is curved.

Embodiments of the present disclosure can be implemented in electronic devices including a portable terminal such as, for example, a smart phone and a mobile telecommunication terminal.

Figure 1:
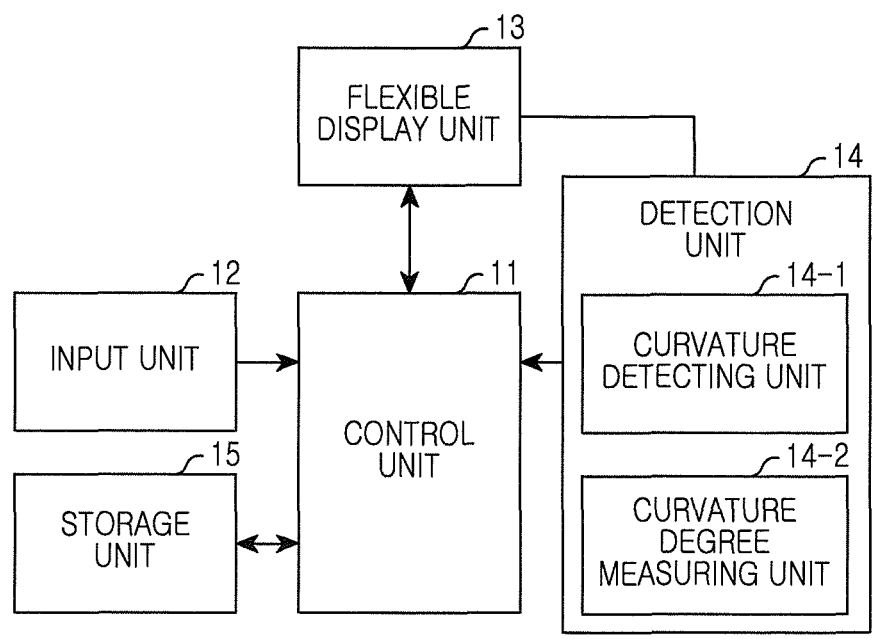
FIG. 1 illustrates a portable terminal according to an embodiment of the present disclosure.

FIG. 1 illustrates a portable terminal according to an embodiment of the present disclosure.

Referring to FIG. 1, the portable terminal includes a control unit 11, an input unit 12, a flexible display unit 13, a detection unit 14, and a storage unit 15.

The control unit 11 sets an execution environment of the portable terminal, retains information thereof, operates the portable terminal stably, and facilitates data input/output exchange between all the units of the portable terminal. Also, the control unit 11 includes a codec that converts video and audio signals that have passed through the flexible display unit 13.

The input unit 12 outputs an input signal to the control unit 11.

The flexible display unit 13 displays a signal received from the control unit 11.

The flexible display unit 13 can be a touch sensitive display, called as a touch screen. In this situation, a touch input is performed via the touch sensitive display.

The detection unit 14 acquires information about a curvature of the flexible display unit 13.

The storage unit 15 stores data about an operation of the portable terminal. The control unit 11 performs an operation according to embodiments of the present disclosure by loading information from the storage unit 15.

The detection unit 14 includes a curvature detecting unit 14-1 and a curvature degree measuring unit 14-2. The curvature detecting unit 14-1 detects a curvature of the flexible display unit 13 and notifies the curvature to the control unit 11. The curvature measuring unit 14-2 measures a curvature degree of the flexible display unit 13 on the basis of coordinates and provides the measurement result to the control unit 11.

For example, the curvature degree measuring unit 14-2 measures a magnitude of pressure, which is generated when the flexible display unit 13 is curved, on the basis of coordinates on the screen and provides a measurement result to the control unit 11. Generally, the curvature degree increases as the magnitude of pressure increases. In addition, the curvature degree measuring unit 14-2 measures a curvature radius on the basis of coordinates on a screen, and provides a measurement result to the control unit 11. Generally, the curvature degree increases as the curvature radius decreases. The portable terminal includes a module that measures a curvature radius or a magnitude of pressure depending upon a curvature of the screen on the basis of coordinates.

The control unit 11 detects a coordinate-based curvature degree and a curvature/non-curvature of the flexible display unit 13 from the measurement result received from the detection unit 14.

In particular, the control unit 11 determines a point in the screen, at which a curvature degree is greatest, as a center and moves an object toward the center. That is, the center can be a destination of the object. In certain embodiments, the control unit 11 includes the detection unit 14. Based on this embodiment, a flexible display control method will be described below with reference to the drawings. The object on the screen is an object designated as an application target of a movement event, examples of which include an icon and widget.

Figure 2:
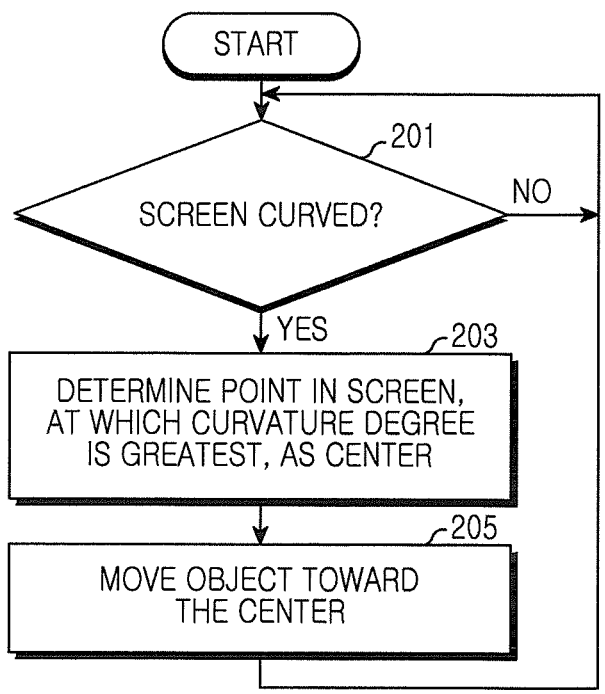
FIG. 2 illustrates a flexible display control process according to an embodiment of the present disclosure.

FIG. 2 illustrates a flexible display control process according to an embodiment of the present disclosure.

Referring to FIG. 2, in step 201, the control unit 11 determines whether the screen is curved. The curvature of the flexible display unit 13 corresponds to the curvature of the screen.

In step 203, the control unit 11 determines a point in the screen, at which a curvature degree is greatest, as a center. The control unit 11 measures a magnitude of pressure generated by the curvature of the screen on the basis of coordinates, and determines coordinates corresponding to the greatest pressure as the center. In addition, the control unit 11 measures a curvature radius on the basis of coordinates, and determines coordinates corresponding to the smallest curvature radius as the center.

In step 205, the control unit 11 moves an object toward the center. The control unit 11 measures a curvature degree at a point in the screen, at which the object is located. Also, the control unit 11 determines a speed toward a next position according to a predetermined velocity corresponding to the measured curvature degree, and moves the object at the determined speed. For example, the predetermined velocity increases as the curvature degree increases.

Thereafter, the steps following step 201 are performed. Herein, when a curvature shape is changed, the center in step 203 and the speed in step 205 can also be changed. The movement direction of the object is oriented toward the center. Therefore, when the center in step 203 is changed, the movement direction of the object is also changed. The control unit 11 performs step 205 with respect to the changed movement direction. That is, when the center is changed, the movement speed of the object is changed. This process is ended when the curvature of the screen is released. When the curvature of the screen is not released, a process of moving the object toward the determined center at the determined speed is continued.

The control unit 11 performs an object designating step before the process illustrated in FIG. 2.

The method described above in relation with FIG. 2 can be provided as one or more instructions in one or more software modules stored, or computer programs in electronic devices, including a portable terminal such as a smart phone and a mobile telecommunication terminal.

Figure 3A:
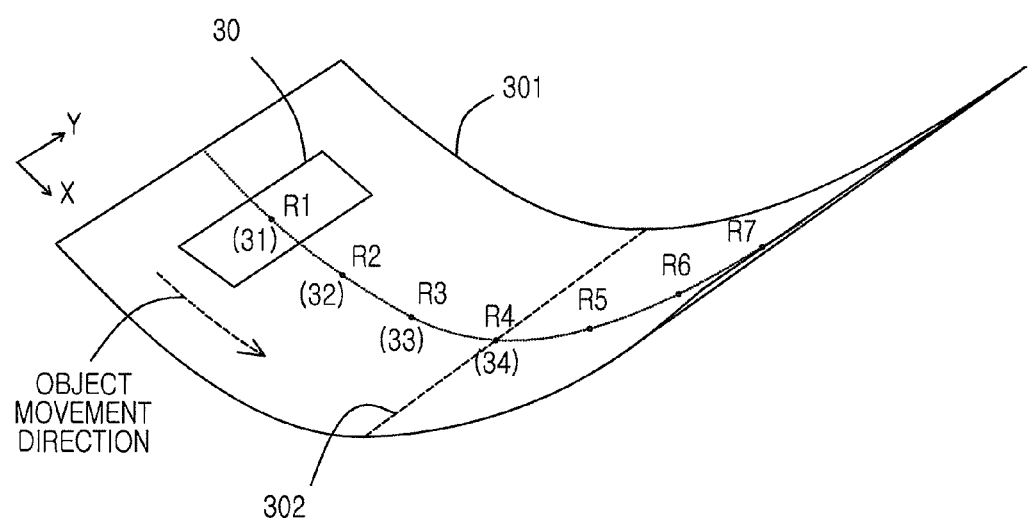
FIGS. 3A and 3B illustrate flexible display control methods according to embodiments of the present disclosure.
Figure 3B:
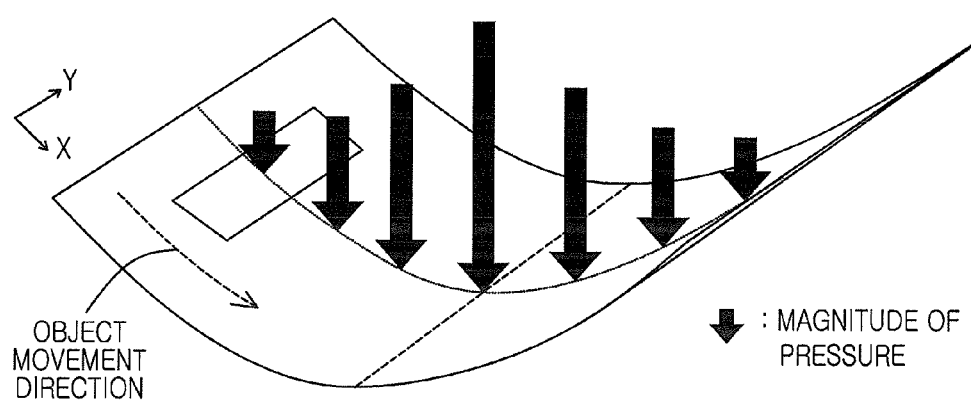

FIGS. 3A and 3B illustrate flexible display control methods according to embodiments of the present disclosure. In the embodiments of FIGS. 3A and 3B, it is assumed that there is no curvature of a screen with respect to a Y axis. Thus, an object moves along an X axis.

Referring to FIG. 3A, when a screen 301 is curved, the control unit 11 measures curvature radiuses with respect to coordinates at predetermined intervals (e.g., pixel intervals), and moves an object 30 toward coordinates 302 corresponding to a curvature radius R4 that is greatest among them. Since it is assumed that there is no curvature of the screen with respect to the Y axis, the movement direction of the object 30 is uniform. Herein, the control unit 11 measures a curvature radius at coordinates, at which the object 30 is located, determines a speed toward a next position according to a predetermined velocity corresponding to the measured curvature radius, and moves the object 30 at the determined speed. For example, when the curvature is maintained, the object 30 moves to a center 34 while changing predetermined velocities corresponding to curvature radiuses at coordinates 31, 32 and 33 located in the movement direction.

The embodiment of FIG. 3B determines a curvature degree by measuring a magnitude of pressure generated by the curvature of a screen, and follows the process illustrated in FIG. 3A.

In conclusion, embodiments of the present disclosure provide a user interface for determining a point in a screen, at which a curvature degree is greatest, as a center when a flexible display is curved, and moving an object toward the determined center.

Embodiments of the present disclosure, according to the claims and description in the specification, can be realized in the form of hardware, software or a combination of hardware and software.

Such software can be stored in a computer readable storage medium. The computer readable storage medium stores one or more programs (software modules), the one or more programs comprising instructions, which when executed by one or more processors in an electronic device, cause the electronic device to perform methods of the present invention.

Such software can be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs be conveyed electronically via any medium such as a communication signal carried over a wired or wireless connection and embodiments suitably encompass the same.

While the disclosure has been shown and described with reference to certain exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method for controlling a flexible display in an electronic device, comprising:
in response to a curvature of the flexible display, detecting a coordinate in a screen of the flexible display, at which a curvature degree is greatest;
setting the detected coordinate as a destination; and
moving an object on the screen of the flexible display toward the destination.

2. The method of claim 1, further comprising, before detecting the coordinate in the screen of the flexible display at which the curvature degree is greatest, detecting the curvature of the screen of the flexible display.

3. The method of claim 1, wherein detecting the coordinate in the screen of the flexible display at which the curvature degree is greatest comprises:
measuring a curvature radius on the basis of coordinates; and
determining the coordinate corresponding to the smallest curvature radius.

4. The method of claim 1, wherein detecting the coordinate in the screen of the flexible display at which the curvature degree is greatest comprises:
measuring a magnitude of pressure generated by the curvature of the screen on the basis of coordinates; and
determining the coordinate corresponding to the greatest pressure.

5. The method of claim 1, wherein the moving of the object on the screen toward the destination comprises:
measuring a curvature degree at a current position of the object; and
determining a speed from the current position toward the destination according to a predetermined velocity corresponding to the measured curvature degree.

6. The method of claim 5, further comprising:
moving the object at the determined speed.

7. An electronic device, comprising:
a flexible display unit;
a curvature detecting unit configured to detect a curvature of the flexible display unit;
a curvature degree measuring unit configured to measure a curvature degree of the flexible display unit on the basis of coordinates;
a storage unit configured to store data about an operation of the portable terminal; and
the control unit configured to:
detect a curvature of the flexible display unit from the curvature detecting unit,
determine a coordinate in a screen of the flexible display, at which a curvature degree is greatest, as a center from the measurement result received from the curvature degree measuring unit,
setting the determined coordinate as a destination, and move an object on the screen toward the destination, with reference to the data stored in the storage unit.

8. The electronic device of claim 7, wherein the curvature degree measuring unit is configured to measure a curvature radius on the basis of coordinate, and wherein the control unit is configured to determine the coordinate corresponding to the smallest curvature radius.

9. The electronic device of claim 7, wherein the curvature degree measuring unit is configured to measure a magnitude of pressure generated by the curvature of the flexible display unit on the basis of coordinates, and wherein the control unit is configured to determine the coordinate corresponding to the greatest pressure.

10. The electronic device of claim 7, wherein the control unit is configured to:
acquire a curvature degree at a current position of the object through the curvature degree measuring unit;
detect a predetermined velocity corresponding to the acquired curvature degree from the storage unit;

determine a speed from the current position toward the destination according to the detected predetermined velocity; and move the object at the determined speed.

11. An electronic device, comprising:
a flexible display;
a storage unit;
at least one microprocessor; and
one or more modules stored in the storage unit and configured to be executed by the at least one microprocessor, the one or more modules comprising instructions configured to cause the at least one microprocessor to:
  detect a coordinate in a screen of the flexible display, at which a curvature degree is greatest,
  set the detected coordinate as a destination, and
  move an object on the display toward the destination.

12. The electronic device of claim 11, wherein the instructions are configured to cause the at least one microprocessor to, prior to determining the point at which the curvature degree is greatest, detect the curvature of the screen of the flexible display.

13. The electronic device of claim 11, wherein the instructions are configured to cause the at least one microprocessor to detect the coordinate in the screen of the flexible display at which the curvature degree is greatest by:
  measuring a curvature radius on the basis of coordinates; and
  determining the coordinate corresponding to the smallest curvature radius.

14. The electronic device of claim 11, wherein the instructions are configured to cause the at least one microprocessor to detect the coordinate in the screen of the flexible display at which the curvature degree is greatest by:
  measuring a magnitude of pressure generated by the curvature of the screen on the basis of coordinates; and
  determining the coordinate corresponding to the greatest pressure as the center.

15. The electronic device of claim 11, wherein the instructions are configured to cause the at least one microprocessor to move the object on the screen toward the destination by:
  measuring a curvature degree at a current position of the object; and
  determining a speed from the current position toward the destination according to a predetermined velocity corresponding to the measured curvature degree.

16. The electronic device of claim 15, wherein the instructions are further configured to cause the at least one microprocessor to:
  move the object at the determined speed.

17. The electronic device of claim 15, wherein the electron device comprise a portable terminal.

18. The electronic device of claim 15, further comprising a detection unit configured to detect the curvature degree.

19. The electronic device of claim 7, wherein the electronic device is a smart phone.

20. The electronic device of claim 7, further comprising a detection unit configured to detect the curvature degree.

* * * * *